Feb. 17, 1931. G. B. BOGART 1,792,887
CARBON REMOVING APPARATUS
Filed Feb. 1, 1928  2 Sheets-Sheet 1
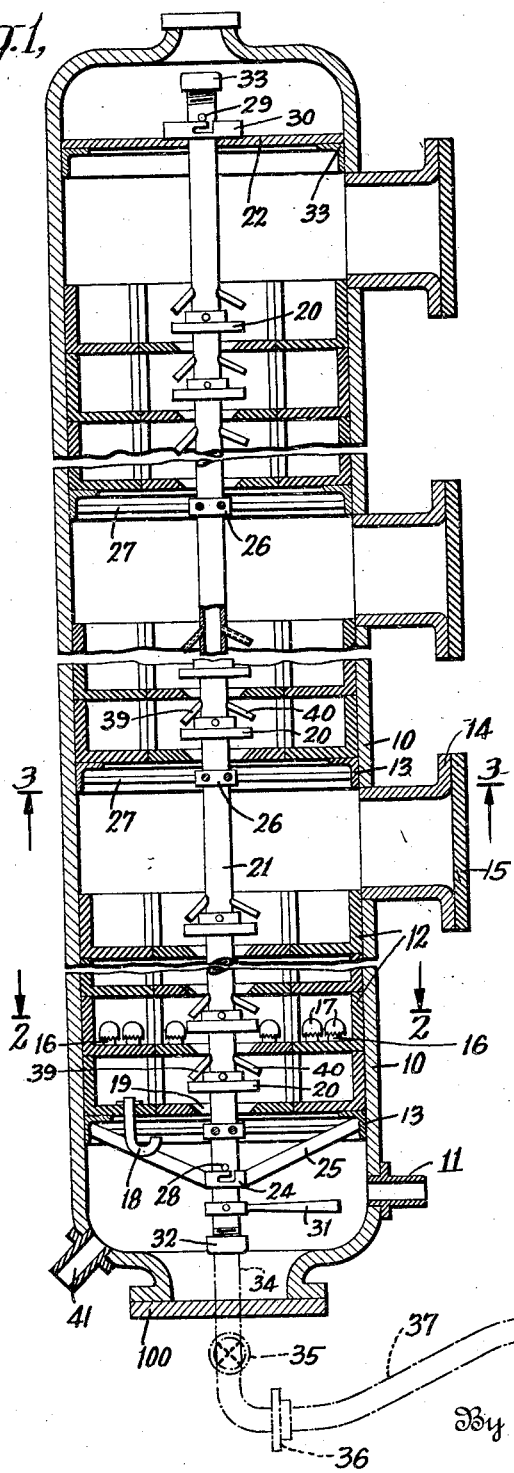
Fig.1,
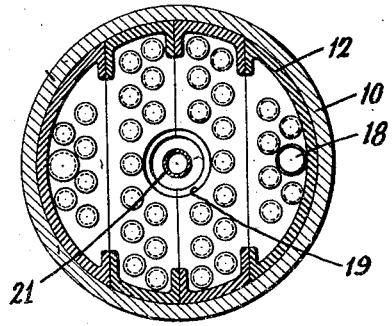
Fig.2,
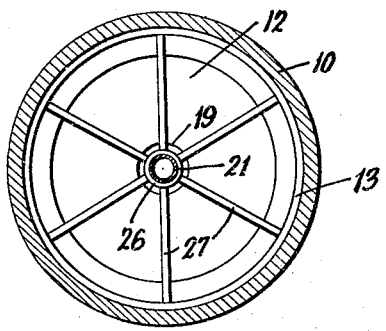
Fig.3,
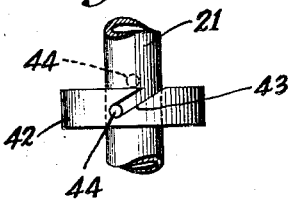
Fig.4,
Inventor
Guy B. Bogart
By his Attorney
R. J. Dearborn

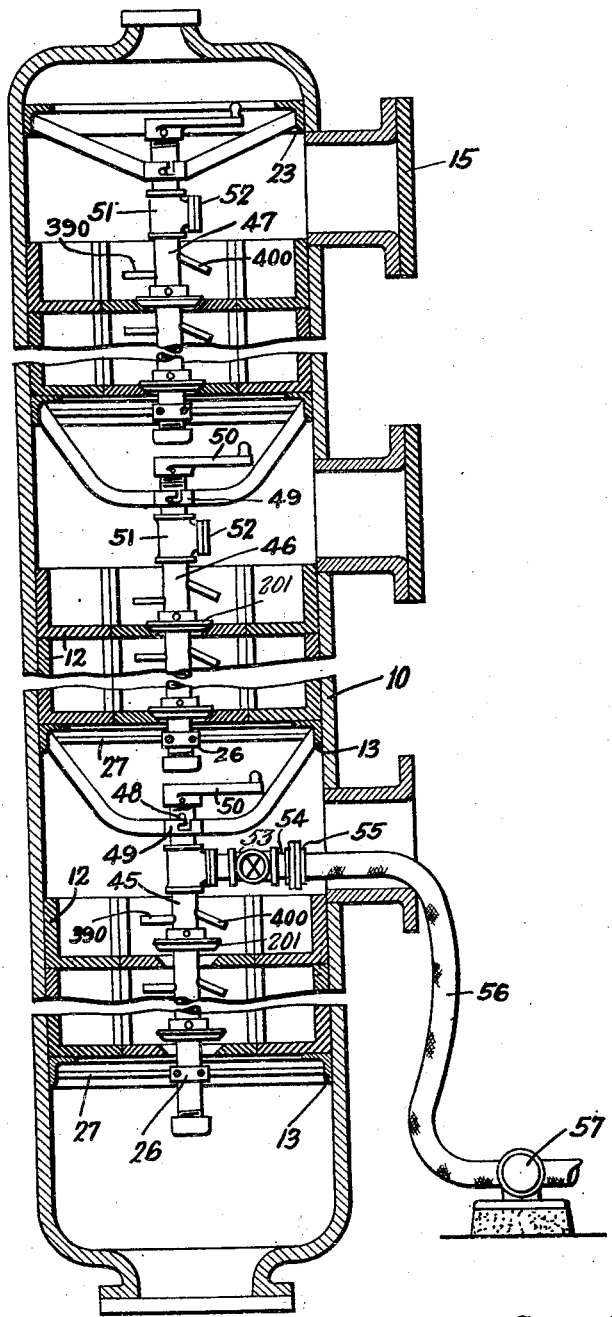

Patented Feb. 17, 1931

1,792,887

UNITED STATES PATENT OFFICE

GUY B. BOGART, OF LOCKPORT, ILLINOIS, ASSIGNOR TO THE TEXAS COMPANY, OF NEW YORK, N. Y., A CORPORATION OF DELAWARE

CARBON-REMOVING APPARATUS

Application filed February 1, 1928. Serial No. 251,023.

The invention has particular reference to fractionating or separating towers and especially to those of the type commonly known as bubble towers. It is a primary feature of the invention to provide means for speedily and effectively cleaning the trays of a tower of this sort without removing them from the enclosing shell.

In the course of the operation of a fractionating tower, carbon, which is carried in suspension in the vapors which are led into the tower from a still or other source of vapors, is deposited on the trays or other surfaces within the tower and if allowed to accumulate, would gradually form a layer of considerable thickness on all such surfaces, particularly those toward the bottom of the tower. These deposits gradually impair the operation of the apparatus and tend to reduce its efficiency and its capacity for the handling of vapors. In the past, it has been customary to discontinue the operation of the apparatus at periodic intervals to remove the trays for the purpose of scraping or otherwise removing the deposited carbon. These periods of shutdown have been required at fairly frequent intervals and have consumed a considerable amount of time. It is contemplated by the present invention to eliminate the necessity for removing the trays, or at least to lengthen the periods between such time as it is necessary to remove and clean the trays. By the employment of the present invention, therefore, the amount of time lost due to cleaning and repairing of the fractionating equipment is considerably lessened and may be rendered almost negligible. Toward this end it is proposed to flush out all or part of the trays of a bubble tower after each run of the stills which serve to supply the vapors that are passed through the tower. Any suitable medium may be provided for washing out the trays in this manner. Very satisfactory results have been produced by the use of water discharged with sufficient velocity against the surfaces to be cleaned, although it is contemplated that solvents or steam or similar media may be employed in lieu of the water.

With the foregoing general objects in view, the invention contemplates various novel features of construction and arrangement of parts for bringing about the desired end. Various incidental objects will become more apparent as the description of an illustrative form of the invention progresses in detail. In the following sections which are to be considered in connection with the accompanying drawings, one preferred embodiment is disclosed and several modifications are suggested but it is to be understood that numerous other modifications and changes may be made without departing from the spirit of the invention. Of the drawings:

Figure 1 is a sectional elevational view through a bubble tower, embodying the features of the present invention.

Figure 2 is a horizontal sectional view taken through the tower at the point 2—2 of Figure 1.

Figure 3 is a similar sectional view taken through the tower at the point 3—3 of Figure 1.

Figure 4 is a detail of a modified form of collar which may be employed in the illustrative apparatus.

Figure 5 is a view similar to Figure 1 but illustrating a modified form of the invention.

Referring now to Figure 1, there is illustrated a conventional form of fractionating or separating tower having an outer shell 10 of suitable thickness to withstand the pressures to which it is desired to subject the tower. This shell may, if desired, be heat-insulated to avoid chilling at the surface and to permit a more uniform control by the introduction of a cooling medium within the tower. The employment of insulation, however, is not essential to the present invention.

An inlet 11 toward the bottom of the tower is adapted to be connected by means of a vapor line to any suitable source, such as a still, for the generation of vapors which it is desired to fractionate. Within the shell 10 there may be mounted a plurality of trays 12, of any known or usual construction, which are adapted to retain a certain quantity of condensate from the vapors passed through the tower so that fresh vapors introduced may be forced through, and be brought into intimate contact with, previously condensed vapors. The trays 12 may, if desired, be arranged in one continuous tier from the bottom to the top of the tower. In the form of tower illustrated, however, the trays have been shown as arranged in groups, three such groups being illustrated. For example, in a tower provided with thirty-nine trays, the latter may be grouped into an upper nest of ten trays and an intermediate nest of nineteen trays and a lower nest of ten trays, although any other number and arrangement of trays may be adopted, as may be found desirable. Each group of trays is supported by means of an annular angle member 13 which is welded or otherwise secured to the inside of the shell 10. Thus the lowermost tray of each group is directly supported by one of these angle members while each of the remaining trays of each group may be supported by the upstanding flanges of the next lower tray. Above each group of trays the shell 10 will preferably be provided with an opening fitted with a suitable manway 14 to provide access to the uppermost tray of each group for the purpose of inspection and removal. Suitable covers 15 are provided for and normally applied to the manways to form an air-tight seal. Any suitable arrangement may be provided on each of the trays for the purpose of retaining the desired amount of condensate and for forcing the vapors to pass successively through the pools of condensate carried by the series of trays. For example, each tray may be provided with a large number of risers or nipples 16 which are covered by suitable caps 17 having their lower edges serrated or provided with openings for the passage of the vapors. Any suitable means such as crossbars extending across the tops of the caps may be employed for holding the latter in position on the risers, or each cap may be provided with an extension which abuts against the underside of the tray next above, for this purpose. Overflow pipes 18 may also be provided, one for each tray. These pipes are preferably so arranged that the upper end extends above the bottom of the tray to an amount equivalent to the desired depth of condensate to be retained; the lower ends of these pipes are then extended into the liquid carried by the next lower tray. In this way these pipes form an effective means for maintaining the level of liquid on the trays and at the same time they are sealed against the free passage of vapors.

As best shown in Figure 2, each of the trays 12 is preferably formed in four sections which, when assembled into the tower, may be bolted together to form a unit equivalent to a unitary tray. This sectional construction is adopted for the purpose of permitting the insertion and withdrawal of the trays in and from the tower through the manway openings 14 which, as shown, are of much smaller diameter than the diameter of the trays. Near the longer edge of one of the central sections of each tray, there is provided an opening 19 which is normally closed by a valve 20. The location of the opening 19 is such that it is as close to the center of the tray as a whole as it is possible to place it in a tray constructed of four separate sections as shown. If desired, the size and shape of the several sections of the tray might be modified to enable the location of the opening 19 in one of the sections and precisely at the center of the entire tray, or if desired, the opening 19 might be located precisely in the center of the tray by forming half of the opening in each of the two middle sections, so long as care is exercised in the assembly of the trays to produce an exactly circular opening which may be tightly sealed by means of the valve 20.

All of the valves for the entire series of trays in all of the groups are secured to a tubular shaft or pipe 21 which extends through the series of openings 19 substantially from the bottom to the top of the tower. This tubular shaft at its upper end may be guided by means of an opening in a circular perforated disc 22 which is carried by an annular angle member 23 similar to the members 13. At its lower end the shaft is preferably guided and held in its proper vertical position by means of a collar 24 supported suitably by means of straps 25 extending downwardly and toward the center from the lowermost angle member 13. The straps 25 may be secured in any suitable way to the angle member and to the collar 24 as by means of welding. At intermediate points the shaft may be guided by a series of collars 26 suitably suspended and held in position by means of spokes or arms 27 extending from the several intermediate angle members 13. For this purpose the spokes 27 may either be welded at both ends to the collar 26 and the angle member 13, respectively, or a screw-threaded connection may be provided at one or both ends of each spoke. Normally, the shaft 21 will drop by its own weight until the series of valves 20 are forced against the bottoms of the trays to seal the openings 19 and maintain the condensate in the trays, as explained hereinbefore. A stud or lug 28 welded to the outside of the tubular shaft normally rests in the lower horizontal portion of a bayonet slot formed in the collar 24. By this means the series of valves 20 are held shut in spite of any differential pressures which may exist on the opposite sides of the latter. A similar arrangement may be provided at the upper end of the tubular shaft, if desired, in the form of a lug 29 formed on the outside of the shaft and a bayonet slot formed in a collar 30 secured to the upper surface of the disc 22. Any suitable means may be provided for securing the valves 20 to the shaft 21, but preferably this means is such as to permit slight adjustment of the valve longitudinally of the shaft so that simultaneous closing of all of the valves may be insured. For this purpose set-screws passing through a hub or collar formed on the valve may be forced into or against the shaft. If desired, a yieldable connection between each valve and the shaft 21 might be provided so that each valve could close the related opening 19 independently of the others under the influence of its weight or a suitable spring, while a lug or shoulder formed on the shaft could be made to engage the under surface of each valve to lift the latter when the shaft is elevated. Below the collar 24 there is secured to the shaft an arm or lever 31 by means of which the shaft may be elevated and rotated. Due to the bayonet slot connection between the lug 28 and the collar 24, and the lug 29 and collar 30, it is necessary first to rotate the shaft slightly before it may be raised. When elevated to a sufficient extent to disengage the lugs 28 and 29 from the collars 24 and 30 respectively, the shaft may be rotated through a complete revolution, or even to a greater extent. During the turning of the shaft the lugs 28 and 29 bearing on the upper surfaces of the collars 24 and 30 may serve to retain the shaft in elevated position. In Figure 1 the parts are shown in such elevated position with the series of valves 20 raised to a desired extent above the bottoms of the trays so as to permit the pasage of liquid through the openings 19.

At its lower and upper ends respectively, the shaft 21 is provided with caps 32 and 33 which normally close off the passage through the center of the shaft. When the lower closure plate 100, which normally seals the lower end of the tower, is removed, access may be had to the cap 32 as well as the lever 31. It is contemplated that the cap 32 will be removed and a pipe 34 provided with a valve 35 will be coupled on to the lower end of the tubular shaft. A suitable union 36 formed at the opposite end of the pipe 34 is adapted to receive the end of a flexible hose 37 which is connected to a suitable pump 38. Throughout the length of the tubular shaft 21 there are provided two series of nozzles 39 and 40, a nozzle of each series being provided in connection with each of the trays. Preferably, these nozzles are directed downwardly at different angles from the shaft, the nozzles 39 being directed preferably at an angle of about 45° to the horizontal whereas the nozzles 40 are preferably directed at an angle of about 20° to the horizontal. The purpose of this construction is to enable the directing of a stream of water or other flushing medium with considerable force, both close to the shaft 21 and at a distance from the latter. It is to be understood that other angles might be adopted for the several nozzles if desired and the invention is not restricted to only two nozzles for each tray since, if desired, a greater number of nozzles each at a different angle of inclination might be provided with relation to each tray. The arrangement of the spray system is such that when the shaft 21 is lifted by means of the lever 31 or other suitable devices, and water is pumped by means of the pump 38 through the flexible tubing 37, valve 35 and pipe 34 into the tubular shaft 21, the series of nozzles 39 and 40 will project a stream of water with considerable force against the surfaces in line therewith.

Now, as the water is discharged through the series of nozzles, the shaft 21 may be rotated by means of the lever 31 and substantially all portions of all of the trays may be subjected to the force of the water. Since all of the valves 20 are at this time in their open positions, the water will flow freely through the openings 19, carrying with it the particles of carbon which have been freed from the surfaces by the jets of water. All of the flushing medium will gravitate to the bottom of the tower and may be discharged either through the opening provided by the removal of the plate 100 or through a pipe 41 provided for this purpose at the bottom of the tower.

While the apparatus has been illustrated in such form that the pipe 34 is only temporarily connected to the pipe 21 upon the removal of the cover-plate 100, it will be understood that this connection may be made permanent and the pipe 34 may then be passed through a suitable stuffing box formed on or carried by the plate 100 and the lower end of this pipe may be normally sealed by means of a cap fitting over the union 36. If this construction is adopted, a suitable lever equivalent to the lever 31 may be provided below the plate 100 for the purpose of lifting and turning the pipe 34 and tubular shaft 21.

If desired, the collars 24 and 30 may be replaced by collars of the type shown in Figure 4 and designated 42. In lieu of the bayonet slots provided in the collars 24 and 30, the collar 42 is shown as provided with an inclined cam slot 43 which is adapted to co-operate with a lug 44 preferably welded to the tubular shaft. It will be apparent that by the use of this form of slot it will only be necessary to rotate the shaft through a small angle by means of the handle 31 in order to cause the shaft to be lifted due to the camming action of the lower edge of the slot upon the lug 44. After the shaft, and hence the valves 20, have been lifted in this way, the valve 35 may be opened to permit the water to be sprayed through the series of nozzles 39 and 40. Continued turning of the handle 31 will permit the entire surface of all of the trays to be flushed out and at the end of slightly more than a complete revolution of the shaft, the lug 44 will be returned to the upper open end of the slot 43. When all surfaces of the trays have been properly flushed and the valve 35 is again closed, the lug 44 may be permitted to again enter the slot 43 to close all of the valves 20 by a slight reverse rotation of the shaft.

In Figure 5 there is shown a modified form of construction which differs from the form shown in Figure 1 primarily by virtue of the division of the tubular shaft into a number of separate sections instead of leaving it in the form of a single unit. For a tower having the trays arranged in groups or nests, it may be found convenient to provide a separate section of shaft for each nest. Thus in the form of tower herein illustrated, the shaft may be formed of three sections, 45, 46 and 47. Each section may be provided with a lug 48 welded thereto toward the upper end and adapted to co-operate with a bayonet slot in a collar 49. If desired, the slot may be inclined, as illustrated in Figure 4 in connection with the collar 42. The guiding and supporting collars 49 are preferably suspended by suitable straps from the annular angle members 13 and 23. At their lower ends the several sections should preferably be guided by means of collars 26, similar to those shown in Figure 1, and supported from the angle members by means of spokes 27. Each section is provided at its top with a lever 50 which may be employed both for lifting the section and for rotating it. Valves or closures 201, similar to valves 20, are provided on each section for normally closing the openings 19 in the bottoms of the trays. As shown, the valves 201 may have tapered edges adapted to fit the tapered sides of the openings 19, if desired, in lieu of merely resting on the flat surfaces adjacent the openings as indicated in Figure 1.

Two series of nozzles, 390 and 400, are provided on each section so that one nozzle of each series is adapted to direct a stream of water against the surface of each tray. These nozzles may be inserted into the pipe section at an angle, as explained in connection with the nozzles 39 and 40, or if desired the nozzles 390 may be placed substantially in a horizontal position while the nozzles 400 may be placed at an angle of about 20° to the horizontal.

In each of the shaft sections there is provided a T 51 which has its outer free end normally closed by a cap 52. The portion of the shaft above the T may be closed off in any suitable way. When it is desired to flush out the trays of any of the sections of the tower, the manway cover 15 for the manway directly above the particular nest of trays may be removed and the cap 52 may be replaced by a valve 53. Any suitable connection may then be provided from the opposite port of the valve 53 to a source of water supply or other flushing medium. For example, there may be provided a short nipple or section of pipe 54, a union 55, and a flexible hose 56 leading to a pump 57. It will be clear that the handle or crank 50 may first be employed to lift the section of shaft and open the valves 201 and then after the valve 53 is opened the shaft may be rotated to cause the two series of nozzles 390 and 400 to flush the entire surface of all of the trays of the particular nest.

It will be obvious that numerous other changes in construction and mode of operation might be adopted without departing from the spirit of the invention and it is desired to be limited in this respect only by the scope of the claims which follow. While the invention has been described and shown as applied to a fractionating tower, it will be understood that it is capable of broader application and may be employed in connection with a still or expansion chamber or various forms of dephlegmating apparatus. As already pointed out, the invention is not limited to the use of water as the flushing medium; if desired, petroleum distillates which act in a measure as solvents of the deposited carbon may be employed for this purpose.

What I claim is:

1. In apparatus of the class described an enclosing shell, a plurality of trays therein, each of said trays being provided with an opening, a valve normally closing each of said openings, means for simultaneously opening all of said valves, and means for directing streams of a flushing medium against all portions of said trays.

2. In apparatus of the class described an enclosing shell, a plurality of trays therein, each of said trays being provided with an opening, a shaft passing through said openings, valves carried by said shaft and adapted normally to close said openings, means for lifting said shaft to raise said valves and for rotating said shaft, and means for directing streams of a flushing medium against the surfaces of said trays.

3. In apparatus of the class described an enclosing shell, a plurality of trays therein, each of said trays being provided with an opening, a shaft passing through said openings, valves carried by said shaft and adapted normally to close said openings, means for lifting said shaft to raise said valves and for rotating said shaft, and means carried by said shaft for directing streams of a flushing medium against the surfaces of said trays.

4. In apparatus of the class described an enclosing shell, a plurality of trays therein, each of said trays being provided with an opening, a shaft passing through said openings, valves carried by said shaft and adapted normally to close said openings, means for lifting said shaft to raise said valves and for rotating said shaft, means carried by said shaft for directing streams of a flushing medium against the surfaces of said trays, and means for supplying said medium to said shaft.

5. In apparatus of the class described a tower shell, said shell being provided with an opening, means normally closing said opening, a plurality of trays in said shell, said shell trays being provided with openings normally covered, means accessible through said shell opening for uncovering said tray openings, and means for flushing out said trays.

6. In a fractionating tower a plurality of trays, said trays being provided with aligned openings, means normally closing said openings, common means for removing said closing means, and a plurality of nozzles for directing a flushing medium against the surfaces of said trays.

7. In a fractionating tower a plurality of trays provided with aligned openings, a hollow shaft passing through said openings, closures for said openings carried by said shaft, and means for shifting said shaft longitudinally to control said closures.

8. In a fractionating tower a plurality of trays provided with aligned openings, a hollow shaft passing through said openings, closures for said openings carried by said shaft, means for shifting said shaft longitudinally to control said closures, and means carried by said shaft for directing a flushing medium against said trays.

9. In a fractionating tower a plurality of trays provided with aligned openings, a hollow shaft passing through said openings, closures for said openings carried by said shaft, means for shifting said shaft longitudinally to control said closures, means carried by said shaft for directing a flushing medium against said trays, and means for supplying said medium to said shaft.

10. In a fractionating tower a plurality of trays provided with aligned openings, a hollow shaft passing through said openings, closures for said openings carried by said shaft, means for shifting said shaft longitudinally to control said closures, means carried by said shaft for directing a flushing medium against said trays, and means for supplying said medium to said shaft, said shaft being rotatable by said first mentioned means to direct said medium in any desired direction.

11. In a fractionating tower a plurality of trays provided with aligned openings, a hollow shaft passing through said openings, closures for said openings carried by said shaft, means for rotating said shaft and simultaneously lifting the same to remove said closures, and means carried by said shaft for directing a flushing medium against said trays.

12. In a fractionating tower a plurality of trays provided with aligned openings, a hollow shaft passing through said openings, closures for said openings carried by said shaft, means for rotating said shaft and automatically lifting the same to remove said closures, nozzles carried by said shaft for directing a flushing medium against said trays, and detachable means for supplying said medium to said nozzles.

13. In a fractionating tower a plurality of trays provided with aligned openings, a hollow shaft passing through said openings, closures for said openings carried by said shaft, means for rotating said shaft and automatically lifting the same to remove said closures, nozzles carried by said shaft for directing a flushing medium against said trays, and means for supplying said medium to said nozzles through said shaft.

14. In a fractionating tower a plurality of trays provided with aligned openings, a hollow shaft passing through said openings, closures for said openings carried by said shaft, means for rotating said shaft and automatically lifting the same to remove said closures, nozzles carried by said shaft for directing a flushing medium against said trays, and detachable means for supplying said medium to said nozzles through said shaft.

In witness whereof I have hereunto set my hand this 16th day of January, 1928.

GUY B. BOGART.